(12) United States Patent
Sugino et al.

(10) Patent No.: US 7,494,159 B2
(45) Date of Patent: Feb. 24, 2009

(54) THREADED JOINT FOR STEEL PIPES

(75) Inventors: Masaaki Sugino, Nishinomiya (JP);
Miyuki Yamamoto, Otsu (JP);
Michihiko Iwamoto, Wakayama (JP);
Shigeo Nagasaku, Nishihomiya (JP)

(73) Assignees: Sumitomo Metal Industries, Ltd.,
Osaka (JP); **Vallourec Mannesmann Oil
& Gas France**, Aulnoye-Aymeries (FR)

( * ) Notice: Subject to any disclaimer, the term of this patent is extended or adjusted under 35 U.S.C. 154(b) by 9 days.

(21) Appl. No.: 11/710,060

(22) Filed: Feb. 23, 2007

(65) Prior Publication Data

US 2007/0236015 A1 Oct. 11, 2007

Related U.S. Application Data

(63) Continuation of application No. PCT/JP2005/015828, filed on Aug. 24, 2005.

(30) Foreign Application Priority Data

Aug. 27, 2004 (JP) .............................. 2004-248359

(51) Int. Cl.
*F16L 25/00* (2006.01)
(52) U.S. Cl. ...................... 285/334; 285/333
(58) Field of Classification Search ......... 285/333–334, 285/355, 390
See application file for complete search history.

(56) References Cited

U.S. PATENT DOCUMENTS

| | | | | |
|---|---|---|---|---|
| 1,927,656 A | * | 9/1933 | Eaton et al. .................. | 285/115 |
| 2,204,754 A | * | 6/1940 | Frame ........................ | 285/334 |
| 4,508,375 A | * | 4/1985 | Patterson et al. ............. | 285/334 |
| 5,749,605 A | * | 5/1998 | Hampton et al. .............. | 285/48 |
| 5,829,797 A | * | 11/1998 | Yamamoto et al. .......... | 285/333 |
| 6,729,658 B2 | * | 5/2004 | Verdillon .................... | 285/333 |
| 2003/0132633 A1 | * | 7/2003 | Maeda et al. ................ | 285/333 |
| 2004/0195835 A1 | * | 10/2004 | Noel et al. ................... | 285/333 |
| 2004/0262919 A1 | * | 12/2004 | Dutilleul et al. ............. | 285/333 |

FOREIGN PATENT DOCUMENTS

| | | |
|---|---|---|
| JP | 02-080886 | 3/1990 |
| JP | 06-281061 | 10/1994 |
| JP | WO 96/07044 | 3/1996 |
| JP | 11-201344 | 7/1999 |
| JP | 11-223284 | 8/1999 |
| JP | 11-294650 | 10/1999 |
| JP | 2001-317668 | 11/2001 |
| JP | 2002-022070 | 1/2002 |
| JP | 2002-061779 | 2/2002 |

* cited by examiner

*Primary Examiner*—Aaron M Dunwoody
*Assistant Examiner*—Fannie Kee
(74) *Attorney, Agent, or Firm*—Clark & Brody

(57) ABSTRACT

In a threaded joint for steel pipes which are connected by threaded engagement of a pin member having a tapered male thread, a metal seal-forming portion, and a torque shoulder-forming portion on the end of a pipe, and a box member having a tapered female thread, a metal seal-forming portion, and a torque shoulder forming-portion corresponding to these on the end of a pipe, a buttress thread having contact at the load flanks and the thread root surface and gaps at the thread crest surface and the stabbing flanks is mixed in a single joint with a rugged thread having contact at the load flanks and stabbing flanks and having gaps at the thread root surface and thread crest surface.

14 Claims, 9 Drawing Sheets

(a)

(b)

Fig. 4
PRIOR ART
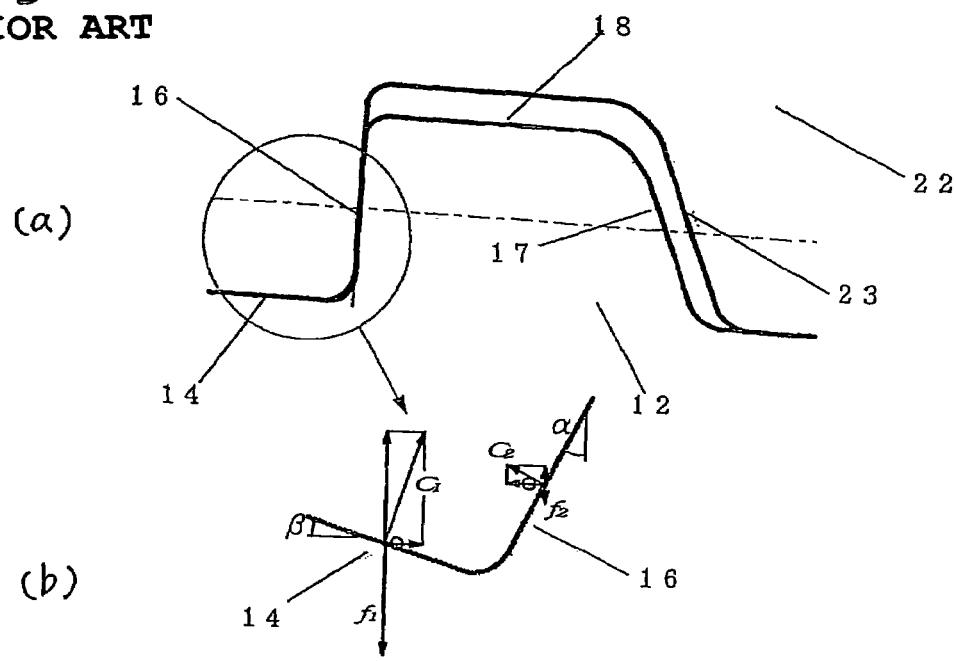
Fig. 5
PRIOR ART
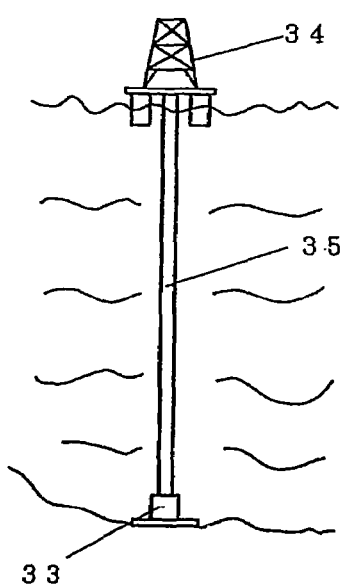
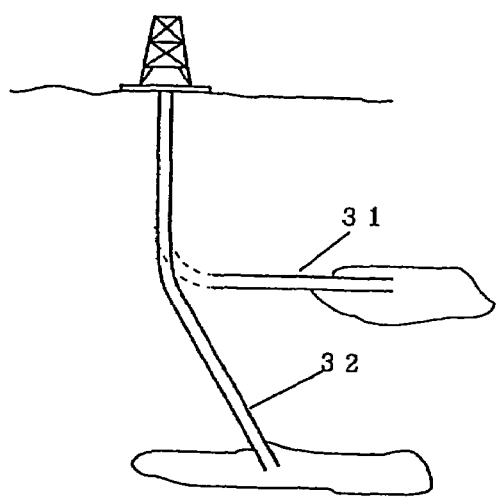

(a)

(b)

US 7,494,159 B2

THREADED JOINT FOR STEEL PIPES

This application is a continuation of International Patent Application No. PCT/JP2005/015828, filed Aug. 24, 2005.

TECHNICAL FIELD

This invention relates to a threaded joint for connecting steel pipes such as oil well pipes, riser pipes, and line pipes used in the exploration and production of oil wells and gas wells, and in particular it relates to a threaded joint for steel pipes having excellent resistance to compression and resistance to external pressure, ability to seal against internal pressure and external pressure under a compressive load, and preferably also excellent operability during installation in the field.

BACKGROUND OF THE INVENTION

Threaded joints are typically used as a means for connecting oil well pipes. In recent years, there has been increasing application of threaded joints to steel pipes which have conventionally been connected by welding, such as riser pipes and line pipes.

Up to now, a standard threaded joint was one meeting API (American Petroleum Institute) standards, but in recent years, the environments of excavation and production of crude oil and natural gas are becoming more severe, so there is increasing use of special threaded joints referred to as premium joints.

FIGS. 1(a) and 1(b) are a schematic cross sectional view of one example of a premium joint and an enlarged view of a portion thereof. Normally, a premium joint has tapered threads 12 and 22, a metal seal portion 4, and a torque shoulder portion 5. The side on which a tapered male thread 12 is provided is referred to as a pin 11, and the side on which a female thread 22 is provided is referred to as a box 21.

The arrangement and combination of the tapered threads, metal seal portions, and torque shoulder portions, the number of each which are provided, and the like vary with the use of the joint. For example, the metal seal portions and the torque shoulder portions are installed at positions A, B, and C shown in FIG. 2(a), i.e., at position A which is on the outer side of the threads, at position B which is between the threads, and at position C which is inwards of the threads.

For example, there are cases in which a metal seal portion and a torque shoulder portion are disposed on the inner side of the joint (FIG. 2(b)), those in which a metal seal portion is disposed on the inner side of the joint and a torque shoulder portion is disposed on the inner side and outer side (FIG. 2(c)), those in which a metal seal portion is provided on the inner side and outer side and a torque shoulder portion is provided at the middle (FIG. 2(d)), and those in which a metal seal portion is provided at the middle and on the inner side and a torque shoulder portion is provided on the outer side (FIG. 2(e)).

As shown in FIGS. 3(a) and 3(b), joints include coupling types (see FIG. 3(a)) in which steel pipes having a pin (a male threaded member) on both ends are connected by a coupling having a box (a female threaded member) provided at both ends of a short pipe, and integral type (see FIG. 3(b)) in which steel pipes having a pin provided on one end and a box provided at the opposite end are directly connected to each other.

Next, the components of a joint will be described in detail using the most typical structure which is shown in FIG. 1 and FIG. 2(b), as an example.

Namely, most threads used in a premium joint are ones resembling a trapezoidal thread referred to as API buttress threads shown in FIGS. 4(a) and 4(b). In this thread, the flanks, which strongly contact at the time of completing make-up, are referred to as load flanks 16, and the flanks on the other side are referred to as stabbing flanks 17 and 23. With a usual buttress thread, there is contact at the thread root surface 14 and a gap at the thread crest surface 18.

Gas tightness, which is one of the important properties of a premium joint, is exhibited by interfitting the metal seal portions with a suitable amount of interference determined by design.

Here, interference refers to a press fit of the sealing surfaces and it is a value given by (diameter of the metal seal portion of the box) minus (diameter of the metal seal portion of the pin).

In order to obtain a strong threaded connection, interference is also provided in the tapered thread portions. In the case of the above-described buttress thread, there is strong contact at the thread root due to the interference of the thread portions.

In this case, interference is the value given by (diameter of the thread portion of the box) minus (diameter of the thread portion of the pin).

Here, the torque shoulder portions function as stoppers for providing a suitable fit between the metal seal portions.

A premium joint can exhibit its properties to a maximum extent by abutting the torque shoulder portions within the range of elastic deformation and completing make-up in a state in which a make-up force in the axial direction is generated within the joint.

If the torque shoulder portions do not abut, a make-up force in the axial direction is not generated, and the amount of tightening becomes inadequate, whereas if the torque shoulder portions abut each other too strongly, the torque shoulder portions end up undergoing plastic deformation, and the sealing properties of the adjoining metal seal portions end up decreasing.

In the past, vertical wells were predominant, so the fundamental properties required of premium joints were the ability to withstand a tensile load due to gravity and an ability to seal against internal and external fluids.

However, in recent years, horizontal wells and sloping wells are increasing, and threaded joints have also come to be used for connecting riser pipes for undersea oil fields.

FIGS. 5(a) and 5(b) schematically explain these states. As shown in FIG. 5(a), an oil well 33 on the sea bottom is connected by a vertically-descending riser pipes 35 to a rig 34 on the surface of the sea, so a large compressive force acts on the riser pipe. In addition, recently, as shown in FIG. 5(b), there are cases in which oil well pipes 31 extend in the horizontal direction or in which oil well pipes 32 are bent. When installing oil well pipes underground in a horizontal well or the like, in order to pass a straight oil well pipe through a curved portion within the ground, the oil well pipe is inserted while being rotated, and at this time, a large compressive force acts on joint portions.

Therefore, the ability to withstand compression is a new property which has come to be demanded of a premium joint.

In addition, in recent years, due to the deepening of oil wells or excavation and production in locations having poor soil properties, there are cases in which oil well pipes undergo large external pressures due to the load from fluids other than products (crude oil and natural gas) outside the well bore or contraction and collapse of the well.

Under such conditions, the ability to seal against external pressure so as to prevent the penetration of high pressure fluids from the exterior has come to be a newly demanded property.

Oil wells typically have a depth from around 3,000 meters to 6,000 meters, and oil well pipes having a length of around 8-10 meters are inserted into a well bore from atop the ground or from atop a rig on the surface of the sea while connected by the above-described threaded joints. Namely, in order to install oil well pipes underground in a single oil well, make-up of threaded joints is carried out approximately 300 to 750 times.

Once underground installation is commenced, it is continued night and day until installation is completed, and it requires approximately two to three days. If make-up of a joint requires one minute extra, for example, overall installation ends up requiring an extra 6 to 12 hours. This results in additional labor costs for field operations and costs for equipment rental, leading to an increase in costs.

Therefore, ease of make-up of a threaded joint is an extremely important property.

Resistance to Compression

Among threads having the object of increasing resistance to compression, there is a thread in which the load flanks and the stabbing flanks of a trapezoidal thread are made to contact and gaps are provided at the thread root surface and the thread crest surface (referred to below as a rugged thread).

FIG. 6(a) is a schematic explanatory view of the cross-sectional shape of a rugged thread 22, and FIG. 6(b) is an explanatory view showing the distribution of forces thereon.

This type of rugged thread 25 is already disclosed in Patent Document 1 and Patent Document 2. In the former, the load flank angle is limited to −20° to 0E, and in the latter, it is limited to 0° to +3°.

In a rugged thread 25, the stabbing flanks 17 of the threads 12 and 22 contact, so a compressive load can be borne by the stabbing flanks 17 of the thread, and it has extremely high resistance to compressive force. On the other hand, there is contact at the load flanks 16 and the stabbing flanks 17 of the threads 12 and 22, so the tolerance of the thread 19 has an extremely large influence on the torque generated by the thread.

With a premium joint, make-up is normally controlled based on the torque. Namely, the torque reaction is monitored during make-up, and make-up is completed when a pre-scribed make-up torque is reached. However, with a rugged thread, the variation in torque due to thread tolerances is extremely large, so it is difficult to set a suitable make-up torque.

A suitable torque indicates a make-up torque which can make the shoulders abut within the range of elastic deformation for all products made to manufacturing tolerances. However, in extreme cases, the torque at the start of shoulder contact (referred to as the shouldering torque) of a product within tolerances exceeds the torque at which the shoulders undergo plastic deformation (referred to below as overtorque) for another product which is within tolerances, and a suitable torque no longer exists.

The above-described situation (generally referred to as the high shouldering problem) is unavoidable with present-day manufacturing control techniques (allowable manufacturing tolerances) particularly with respect to small-diameter rugged threads having an outer diameter of 5 inches or less.

None of the above-described prior art documents has any description with respect to this high shouldering problem, so they do not disclose a method for solving it.

Ability to Seal Against External Pressure

With the object of improving the ability to seal against external pressure, in Patent Document 3, for example, a large portion of a pin member is increased in thickness by swaging (reduction of the inner diameter of the pipe end).

In addition, in Patent Document 4, the resistance to deformation of the end of a pin is increased as much as possible by providing a male thread as close as possible to the torque shoulder of the end of the pin.

In any of the above-described prior art, fundamentally, the resistance to deformation in response to external pressure (resistance to contraction) is increased by increasing the wall thickness of the pin member or of the connecting portion between the torque shoulder at the end of the pin and the thread portion to reduce the decrease in diameter, and a gap is prevented from forming at a metal seal.

Any of this prior art has the effect of increasing the ability to seal against external pressure.

However, in Patent Document 3, it is necessary to perform swaging over a considerable length of the pipe end (probably around 100-200 mm), so a horizontal rolling mill of extremely large power is required, and the swaging die rapidly deteriorates, so there is concern of manufacturing costs becoming quite high. In addition, the inner diameter of a joint is reduced by considerable ratio, so turbulence when internal fluids pass through the joint portion becomes severe and there is a concern of its causing erosion. In addition, in the case of an oil well pipe, the size of pipe which can be inserted into its interior decreases, so the string design ends up being having extremely poor efficiency.

In Patent Document 4, there is the effect that the decrease in the interference of the metal seal portion can be restrained to a certain extent by the amount that the decrease in diameter of the connecting portion between the torque shoulder at the end of the pin and the thread portion is reduced, but compared to the technique in Patent Document 3 in which the thickness of the pin lip is directly increased, its effect is limited.

Ease of Make-up

Prior art with the object of increasing ease of make-up includes Patent Document 5 and Patent Document 6.

This prior art has the object of increasing make-up speed and stabbing properties.

Stabbing properties refer to how smoothly insertion can be carried out to a state in which thread engagement is started at the time of inserting the pin of a male threaded member into the box of a female threaded member. The more easily a pin can be stably inserted to the rearmost portion of a box even when there is a large deviation between the axis of the pin and the box or of the angles therebetween, the better are the stabbing properties of a joint.

Make-up speed is the number of rotations in which a joint can be tightened. The larger the thread taper, the lower the thread height, the greater the thread pitch, and the larger the number of thread ridges, the smaller the number of rotations required for make-up.

The above-described prior art aims at improving stabbing properties and make-up speed primarily by employing a multiple-start thread or by adjusting the slope of the thread crest surface or the thread height.

However, the above-described prior art only improves the ease of make-up, and it cannot be said to improve resistance to compression.

Patent Document 1

Japanese Patent Number 2705505

Patent Document 2
  Japanese Published Unexamined Patent Application Hei 11-294650
Patent Document 3
  Japanese Published Unexamined Patent Application 2002-22070
Patent Document 4
  Japanese Published Unexamined Patent Application 2001-317668
Patent Document 5
  Japanese Published Unexamined Patent Application Hei 11-201344
Patent Document 6
  Japanese Published Unexamined Patent Application Hei 11-223284

DISCLOSURE OF THE INVENTION

Problem to be Solved by the Invention

The object of the present invention is to provide means which can maintain the excellent resistance to compression of a rugged thread and which at the same time can suppress torque variations, which are a problem of rugged threads, to a low level which can be manufactured with current tolerance control techniques, which can guarantee resistance to external pressure, and which can increase operability in the field and particularly make-up speed.

MEANS FOR SOLVING THE PROBLEM

In order to solve the problems of the present invention, the present inventors considered from the standpoint of mechanics why a rugged thread has a large variation in torque compared to a buttress thread.

It will be assumed that a pin member and a box member are made up with an interference of $2\delta$ to a state just before shouldering. Looking at this situation as a whole, a mating force F in the radial direction is generated in the mating portions by the interference $2\delta$.

In a buttress thread, the mating force is borne by the load flanks and the thread root, so the balance of forces between the contact force $C_1$ at the thread root, the contact force $C_2$ at the load flanks, and the mating force can be shown as in FIGS. 4(a) and 4(b). The following four equations can be established based on the angle $\alpha$ of the load flanks with respect to the radial direction and the angle $\beta$ of the thread root with respect to the axial direction of the joint (or in other words the thread taper angle).

$$f_1 = C_1 \cos \beta$$

$$f_2 = C_2 \sin \alpha$$

$$C_1 \sin \theta = C_2 \cos \alpha$$

$$F = f_1 + f_2 \qquad \text{Equation 1}$$

On the other hand, in a rugged thread, the mating force is borne by the load lanks and the stabbing flanks, so the balance of forces between the contact forces $C_3$ and $C_4$ of each flank and the mating force F can be shown as in FIGS. 6(a) and 6(b). If the angle of the stabbing flanks with respect to the radial direction is $\theta$, the following four equations are established.

$$f_3 = C_3 \sin \theta$$

$$f_4 = C_4 \sin \alpha$$

$$C_3 \cos \theta = C_4 \cos \alpha$$

$$F = f_3 + f_4 \qquad \text{Equation 2}$$

As a result of solving Equations 1 and 2, the contact forces $C_1$ to $C_4$ of each of the thread surfaces can be expressed in terms of the mating force F as follows.

$$C_1 = F \cos \alpha / (\sin \alpha \sin \beta + \cos \alpha \cos \beta)$$

$$C_2 = F \sin \beta / (\sin \alpha \sin \beta + \cos \alpha \cos \beta)$$

$$C_3 = F \cos \alpha / (\sinc \alpha \cos \theta + \sin \theta \cos \alpha)$$

$$C_4 = F \cos \theta / (\sin \alpha \cos \theta + \sin \theta \cos \alpha) \qquad \text{Equation 3}$$

Here, if the coefficient of friction of the threads is $\mu$ and the equivalent radius is R, the make-up torque of the threads can be estimated by multiplying the frictional resistance due to the contact forces $C_1$ to $C_4$ by the length of the arm R.

Make-up torque of a buttress thread $T_B = (C_1 + C_2)\mu R$

Make-up torque of a rugged thread $T_R = (C_3 + C_4)\mu R \qquad \text{Equation 4}$ As a typical example, if the load flank angle $\alpha$ is 3°, the thread root angle $\beta$ is 1.8°, the stabbing flank angle $\theta$ of a rugged thread is 30°, and the thread interference $2\delta$ (or in other words the mating force F), the coefficient of friction $\mu$, and the thread equivalent radius R are the same for each type, the make-up torque $T_R$ of a rugged thread is calculated as being 3.3 times the make-up torque $T_B$ of a buttress thread.

Within the range of elastic mechanics, the interference $\delta$ is nearly proportional to the mating force F, so the torque variation $\Delta T_R$ when the range of manufacturing tolerance of the interference is equal to $\Delta \delta$ can also be said to be 3.3 times $\Delta T_B$.

In a rugged thread, another factor which increases the torque variation in addition to those described above is the manufacturing tolerance of the thread width. For example, if the thread width becomes too small (if the thread groove width becomes too large), the female thread recedes in the radial direction from a prescribed meshing position, and to that extent, the substantial interference decreases.

If the manufacturing tolerance of the thread width (in the axial direction) for both the male thread and the female thread is $\Delta a$, from the relationship shown in FIG. 7, the tolerance range of the interference in the radial direction of a rugged thread increases by just the range $\Delta \delta_a$ given by the following equation.

$$\Delta \delta_a = 4 \Delta a / (\tan \alpha + \tan \theta) \qquad \text{Equation 5}$$

Normally, the range of manufacturing tolerance $\Delta a$ of a thread width is on the order of $\frac{1}{5}$ of the manufacturing tolerance range $\Delta \delta$ of the interference, so the substantial interference tolerance range $\Delta \delta_{total} = \Delta \delta + \Delta \delta_a$ of a rugged thread is approximately 2.3 times that ($\Delta \delta$) of a buttress thread, and if one considers the torque variation, it is actually 7.5 times different.

An actual joint is an elasto-plastic body, its shape is more complicated, and there are influences in addition to the above-described tabletop calculations. However, even if they are taken into consideration, the torque variation of a rugged thread is estimated to be 4 to 5 times that of a buttress thread.

From the above-considerations based on mechanics, the present inventors concluded that it is unavoidable that the torque variation of a rugged thread is large in light of present manufacturing tolerances. At the same time, they newly focused on the fact that the torque variation of a buttress thread is small compared to its manufacturing tolerances, and they perceived that if both thread shapes are combined in a single joint, the torque stability of a buttress thread can be obtained while maintaining the excellent resistance to compression of a rugged thread, and they achieved the present invention.

Next, the present inventors studied the mechanism when a leak of outside pressure occurs in the typical premium joint of FIG. 1, and they studied the requirements of a strong seal against external pressure.

With almost all metal seal portions of premium joints, a strong contact force is generated by fitting seal surfaces, which are conical surfaces or surfaces formed by rotating a curve, against each other in the radial direction to generate a contact force and product intimate contact between the seal surfaces.

When external pressure is applied for a long period, the external pressure penetrates along the gaps in the portions of threaded engagement to the interior of the joint just before the metal seal, and a force acts in the direction tending to separate the pin member and the box member from each other in the radial direction.

Namely, from the standpoint of the pin member, an external pressure, which is nearly the same as that acting on the body of the pipe, acts on the male thread surface up to before the metal seal portion, and to the extent that its wall thickness is less than that of the pipe body, its resistance to shrink deformation (in order to distinguish it from bending stiffness, which will be described below, it will be referred to here as shrink stiffness) is smaller, and the reduction in its diameter increases.

If the outermost end of a pin member is a free end, its bending stiffness (as a cylindrical shell) against external pressure becomes a minimum, so it greatly flexes (undergoes bending deformation).

As a result of this reduction in diameter and bending deformation, the seal interference, i.e., the seal contact force decreases, and it is thought that leaks develop in the metal seal portion when it falls below a prescribed limit.

Accordingly, in order to obtain a seal which does not readily leak in response to external pressure, the following three methods are conceivable: (i) increasing the (initial) seal interference, (ii) increasing the shrink stiffness of the pin member (namely increasing the wall thickness of the pin member), and (iii) increasing the bending stiffness of the metal seal portion of the end of the pin.

With the above-described method (i), if it is made too large, it becomes the cause of occurrence of galling (seizing) at the time of make-up, so there is an upper limit to provide a balance with galling resistance. Determining the upper limit involves various design factors of a threaded joint, so in the present invention, the approach of method (i) was not used.

Above-described method (ii) is a method which was perceived and utilized in the prior art (Patent Document 3 and Patent Document 4), but it has problems such as difficulty of manufacture.

Above-described method (iii) is not seen in the prior art. However, it is thought that a prescribed effect can be obtained by increasing the lip thickness to a certain extent.

In light of the above considerations, the concept of the present invention was achieved, which is that the ability to seal against external pressure can be further effectively increased by considering the shape of a metal seal portion (lip portion) having a shape which simultaneously realizes methods (ii) and (iii).

Finally, as a method of simultaneously realizing the concept of the above-described compound thread and the concept of the metal seal portion or lip shape, if a thread is divided into two or more portions and a rugged thread portion and a buttress thread portion are provided and a metal seal portion is provided between both portions, the wall thickness of the metal seal portion on the pin side can be considerably increased, and the end of the metal seal portion can be extended, and its bending stiffness can be increased.

Here, the present invention is as follows.

(1) A threaded joint for a steel pipe having a pin member having a tapered male thread, a metal seal-forming portion, and a torque shoulder-forming portion, and a box member having a tapered female thread, a metal seal-forming portion, and a torque shoulder-forming portion corresponding to those of the pin member, characterized in that the threads which constitute the tapered male thread and the tapered female thread have a first trapezoidal thread portion which does not have simultaneous contact at the load flanks and the stabbing flanks, and a second trapezoidal thread portion which has contact at the load flanks and the stabbing flanks and which has gaps at the thread root surfaces and the thread crest surfaces. surfaces.

(2) A threaded joint for a steel pipe as set forth in (1) wherein the first trapezoidal thread portion has contact at the load flanks and the thread root surfaces, and gaps at the thread crest surfaces and the stabbing flanks.

(3) A threaded joint for a steel pipe as set forth in (1) or (2) characterized in that the load flank angle with respect to a surface perpendicular to the pipe axis is at least $-10°$ and at most $+10°$, and the stabbing flank angle is at least $+15°$ and at most $+50°$.

(4) A threaded joint for a steel pipe as set forth in any of (1) to (3) characterized in that the gap a in the axial direction at the stabbing flanks of the first trapezoidal thread portion satisfies the following equation:

$$0 < a < [(\tan \alpha + \tan \theta)/2] \times \delta$$

wherein $\alpha$ is the load flank angle, $\theta$ is the stabbing flank angle, and $\delta$ is the thread interference (over the diameter).

(5) A threaded joint for a steel pipe as set forth in any of (1) to (4) characterized in that the load flank angle on 1/8 to 1/2 of the inner diameter side of the load flanks of the female thread is at least 25° and at most 60° with respect to a surface perpendicular to the pipe axis.

(6) A threaded joint for a steel pipe as set forth in any of (1) to (5) characterized in that the stabbing flank angle on 1/8 to 1/2 of the inner diameter side of the stabbing flanks of the female thread is at least 25° and at most 60° with respect to a surface perpendicular to the pipe axis.

(7) A threaded joint for a steel pipe as set forth in any of (1) to (6) characterized in that the load flank angle on 1/8 to 1/2 of the outer diameter side of the load flanks of the male thread is at least 25° and at most 60° with respect to a surface perpendicular to the pipe axis.

(8) A threaded joint for a steel pipe as set forth in any of (1) to (7) characterized in that the stabbing flank angle on 1/8 to 1/2 of the outer diameter side of the stabbing flanks of the male thread is at least 25° and at most 60° with respect to a surface perpendicular to the pipe axis.

(9) A threaded joint for a steel pipe as set forth in any of (1) to (8) characterized in that the second trapezoidal thread portion is an incomplete thread portion on the tapered male thread.

(10) A threaded joint for a steel pipe as set forth in (4) characterized in that the second trapezoidal thread portion is an incomplete thread portion on the tapered male thread, and the amount of decrease c (over the radius) of the male thread height in the incomplete thread portion of the tapered male thread satisfies the following equation:

$$c > a/(\tan \alpha + \tan \theta)$$

(11) A threaded joint for a steel pipe as set forth in any of (1) to (10) having a metal seal-forming portion between the first trapezoidal thread portion and the second trapezoidal thread portion.

(12) A threaded joint for a steel pipe as set forth in (11) characterized in that another metal seal-forming portion is provided in addition to the above-described metal seal-forming portion.

(13) A threaded joint for a steel pipe as set forth in any of (1) to (12) wherein the thread is a multiple-start thread.

(14) A threaded joint for a steel pipe as set forth in (13) characterized in that either one of the male thread and the female thread has the same thread dimensions and shape for each ridge of the thread.

According to the present invention, the excellent compression resistance of a rugged thread can be maintained while torque variation, which is a problem of rugged threads, can be restrained to a low level capable of being manufactured with present-day tolerance control techniques, resistance to external pressure can be guaranteed, and operability in the field and particularly make-up speed can be increased.

BRIEF DESCRIPTION OF THE DRAWINGS

FIG. 4(a) is a schematic explanatory view of a API buttress-type trapezoidal thread, and FIG. 4(b) is a schematic view for explaining the balance between the mating force and the thread contact force acting on the thread portion of FIG. 4(a).

FIGS. 5(a) and 5(b) are schematic explanatory views of an undersea oil field and a sloping-horizontal well, respectively.

DETAILED DESCRIPTION OF THE PREFERRED EMBODIMENTS

Next, the present invention will be explained in greater detail with respect to manufacture of a joint according to the present invention.

The thread of a premium joint is machined with a lathe using a cutting bite, referred to as a chaser, having the thread groove shape of a trapezoidal thread.

In order to change the thread shape (groove shape) of a continuous thread midway and mix the above-described rugged thread with a buttress thread, it is normally necessary to employ two different chasers having the shapes of the corresponding threads. However, it is extremely difficult to realize such a manufacturing method, and manufacturing costs end up being extremely high.

In this regard, a joint according to the present invention can provide two different threads in the form of a rugged thread and a buttress thread by usual thread cutting using a chaser with a single shape.

Namely, after a buttress thread having its thread shape and interference adjusted is first worked using one chaser, the female thread height of the portion which is to be made into a rugged thread is reduced by cutting or grinding (referred to below as cutting/grinding), the female thread is reduced in the radial direction by the given interference, and a rugged thread is obtained which has contact at the stabbing flanks instead of at the thread root.

Of course, in order for the portion where the female thread height is reduced in this manner to become a rugged thread, it is necessary to impart suitable thread dimensions and interference.

The present inventors developed design equations for prescribing a suitable combination thereof from the following ideas.

Figure 8:
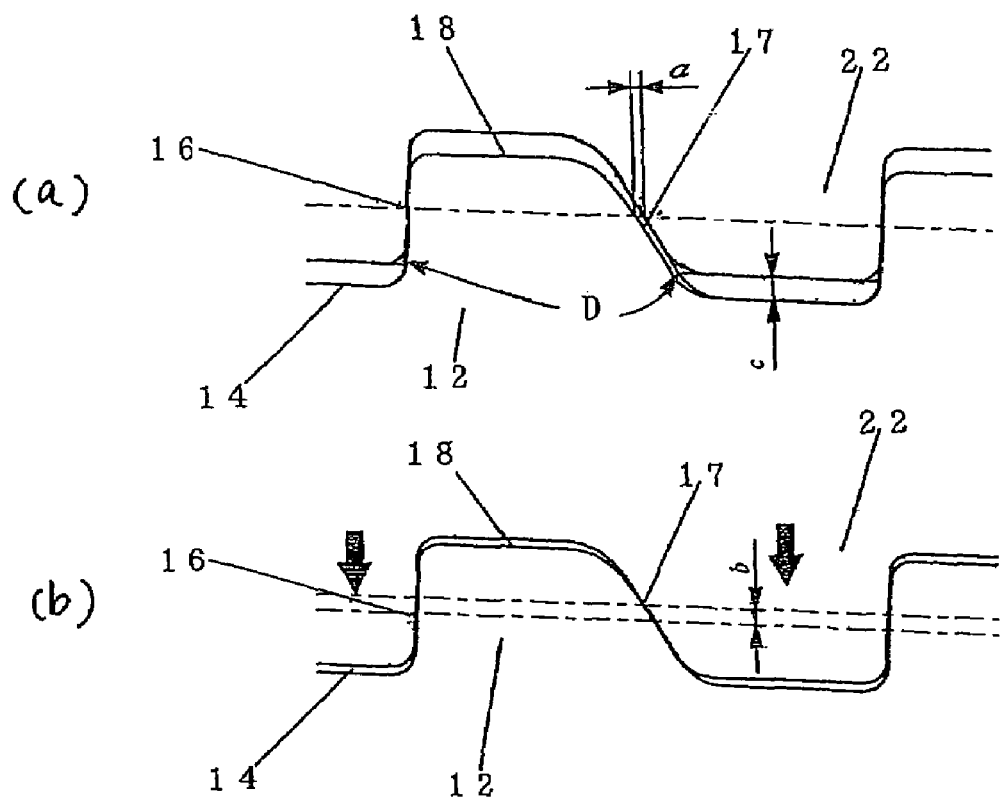
FIGS. 8(a) and 8(b) are schematic explanatory views of the thread shape in a first mode of the present invention.

First, the buttress thread of FIG. 8(a) which has not undergone cutting/grinding will be considered. The gap a between the stabbing flanks must of course be positive, so the following equation is established.

$$a > 0 \qquad \text{Equation 6}$$

Next, it will be assumed that the female threads of the buttress threads of FIG. 8(a) are subjected to cutting/grinding by just a height c to achieve the state shown in FIG. 8(b). At this time, in order to make the thread stabbing flanks contact and obtain a rugged thread, the interference $\delta$ of the threads (over the diameter) must be greater than the decrease b in the height of the female thread, so the following equation is established.

$$(\delta/2) > b = a/(\tan \alpha + \tan \theta) \qquad \text{Equation 7}$$

Incidentally, when the interference $\delta$ does not satisfy Equation 7, only the thread load flanks contact and threads with play result, which is not good.

The height c by which the female thread is cut is of course limited by the following equation.

$$c > b = a/(\tan á + \tan è) \qquad \text{Equation 8}$$

An example of a combination of dimensions which satisfy the above Equations 6, 7, and 8 will be described in detail in the below-described examples.

It does not matter where a rugged thread is provided, or in how many locations, or on how many threads, but in order to better obtain the effects of the present invention, it is preferable to make approximately 2 to 8 threads on the end close to the metal seal portion rugged threads.

In a second mode of the present invention which can mix a rugged thread and a buttress thread using a single chaser, the present inventors additionally invented the following thread shape.

Figure 9:
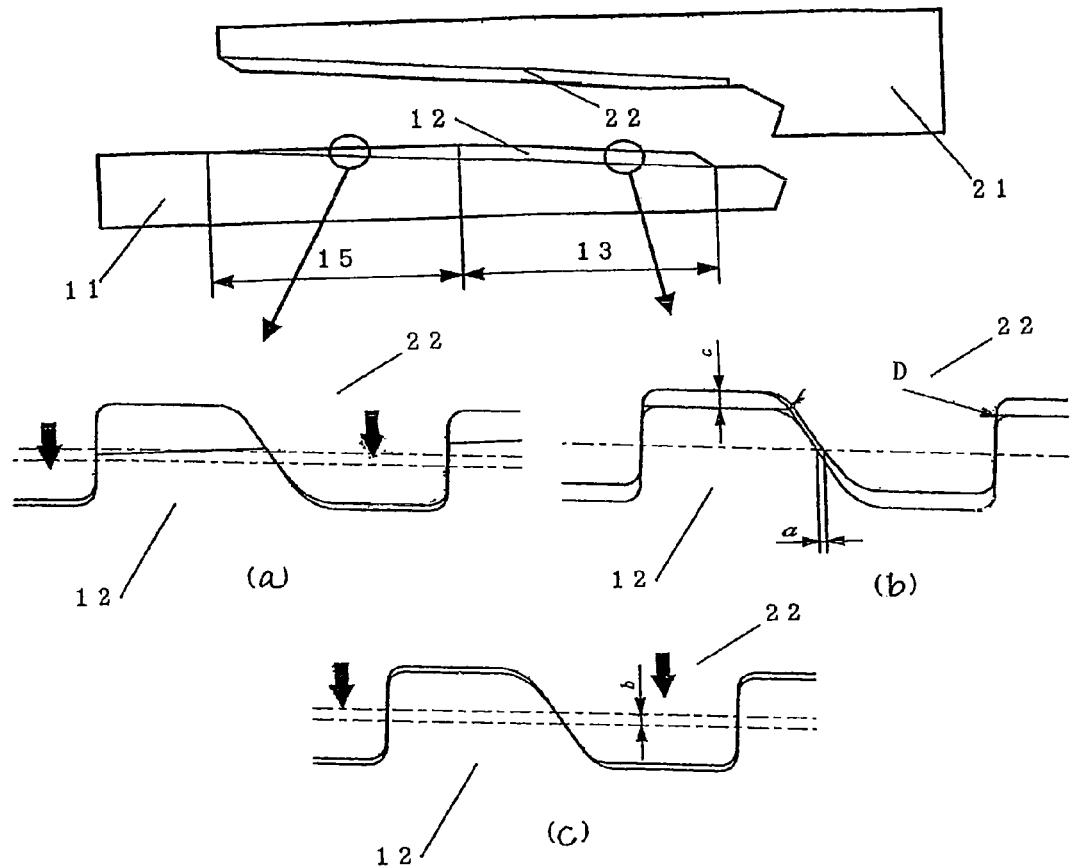
FIGS. 9(a), 9(b), and 9(c) are schematic views for explaining the thread shape in a second mode of the present invention.

Namely, as a second mode, they invented a buttress thread like that shown in FIG. 9(b) in which there is contact at the thread crest surface and the load flanks.

In the case of this thread shape, the male thread height naturally becomes lower in an incomplete thread portion (see FIG. 9(a)), so the complete thread portion becomes a buttress thread and the incomplete thread portion becomes a rugged thread without performing cutting/grinding.

In the case of this second embodiment, the conditions which must be satisfied by the dimensions and tolerance of the threads need only be those given by above-described Equations 6 and 7.

As a variation of this second mode, by performing cutting/grinding of the crest portion of the male buttress thread in a desired location of the complete thread portion, a rugged thread can be added at any location and on any number of threads of the complete thread portion (see FIG. 9(c)).

When actually adding a rugged thread to a complete thread portion in this second mode, approximately 2 to 5 threads at the end near the seal are preferably made into rugged threads.

Up to now, a description was made of cutting/grinding after providing threads as a method of decreasing the thread height, but of course it is possible to cut threads after performing working by cutting or grinding to obtain a prescribed diameter from the diameter of an appropriate portion prior to forming threads (so-called reduction of thread diameter).

When the angles of the load flanks and stabbing flanks of a thread are small, there are cases in which burrs (imprints due to cutting) develop at the corners of threads when performing cutting/grinding in order to reduce the thread height. If left untreated, they become the cause of seizing (galling) at the time of thread make-up, so it is necessary to remove them by deburring as represented by "D" in FIGS. 8(a) and 9(b).

Figure 10:
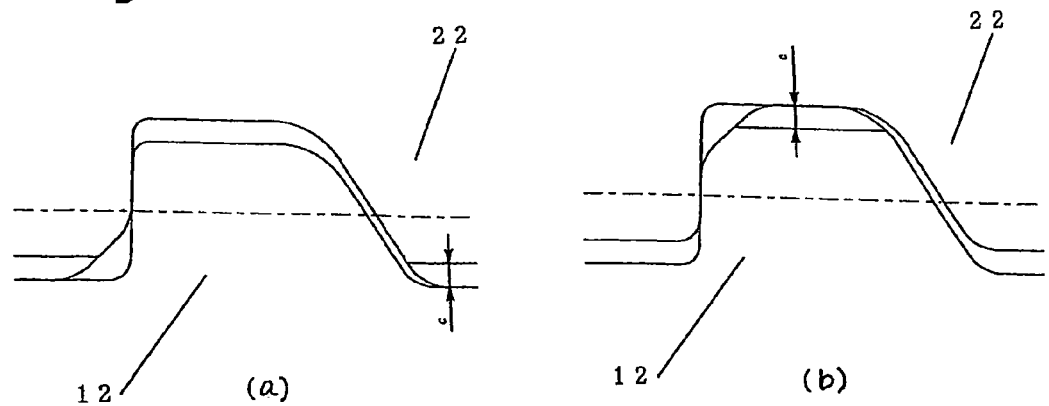
FIGS. 10(a) and 10(b) are schematic views for explaining the thread shape in a third mode of the present invention.

As a result of many years of experience with cutting/grinding, it has been found that if the slope of the thread surface subjected to cutting/grinding is at least approximately 35°, there is almost no occurrence of such burrs. In order to suppress the occurrence of burrs, a third mode of the present invention was invented in which the slope of the end portion of only the load flank of the thread which is cut (the female thread in a first mode (FIG. 10(a)) and the male thread in a second mode (FIG. 10(b)), or only the stabbing flank, or the end portion of both the load flank and the stabbing flank and preferably the portion on 1/8-1/2 of the inner diameter side of the female thread or of the outer diameter side of the male thread is reduced to a value of at least 25° and preferably at least 35° and at most 60°

Threads according to the above-described first, second, and third modes of the present invention can be applied to a threaded joint with tapered threads of the coupling type or integral type for connecting steel pipes of any size or material. In addition, as long as the above-mentioned design equations are satisfied, they can be applied to any thread dimensions, and the effects thereof can be exhibited.

However, in actuality, products of which excellent compression resistance is demanded to the extent that they require rugged threads are primarily threaded joints for oil well pipes, so the pipe size has an outer diameter from roughly 2-3/8 inches (approximately 60 mm) to 20 inches (approximately 510 mm), and the material is primarily a steel such as carbon steel, stainless steel, or chromium alloy steel having a yield strength from 552 MPa (80 ksi) to 1034 MPa (150 ksi).

Figure 2:
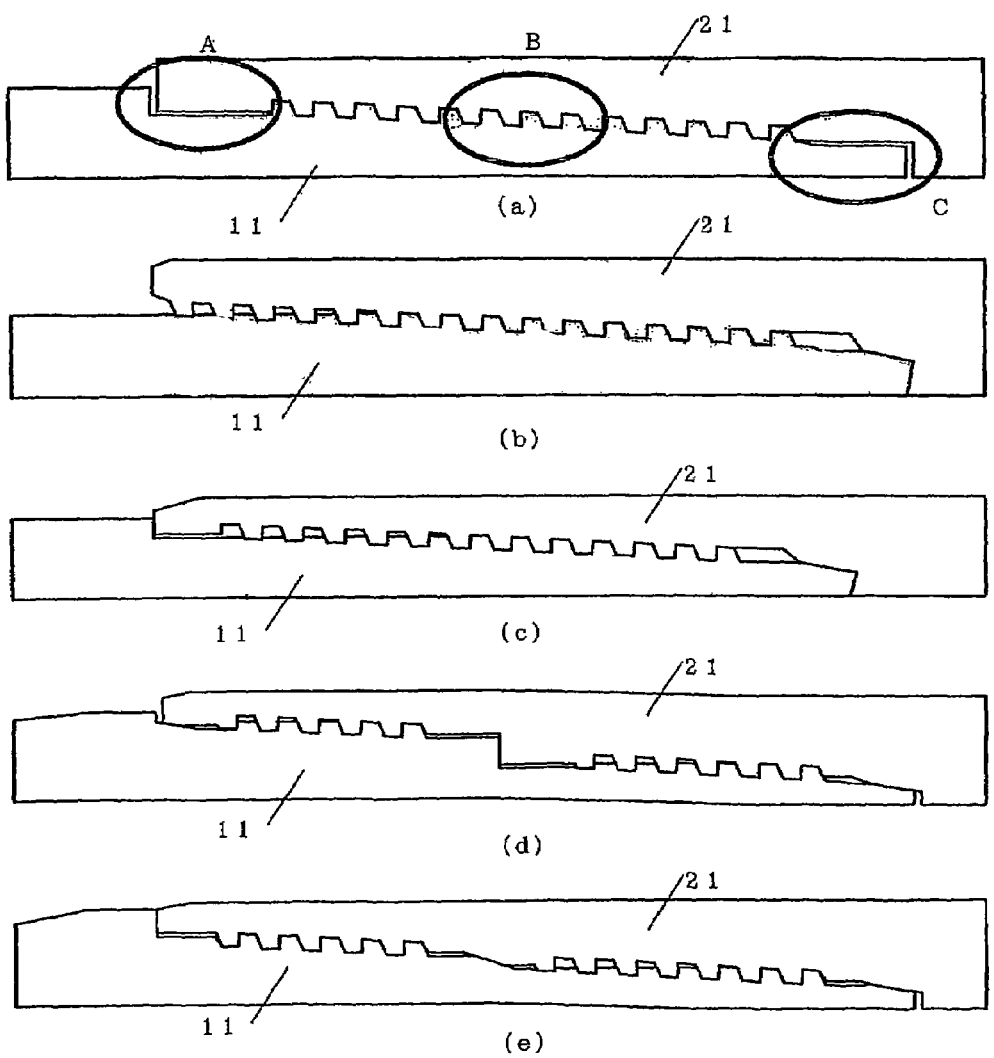
FIGS. 2(a)-2(e) are schematic explanatory views showing various examples of the structure of a premium joint.
Figure 3:
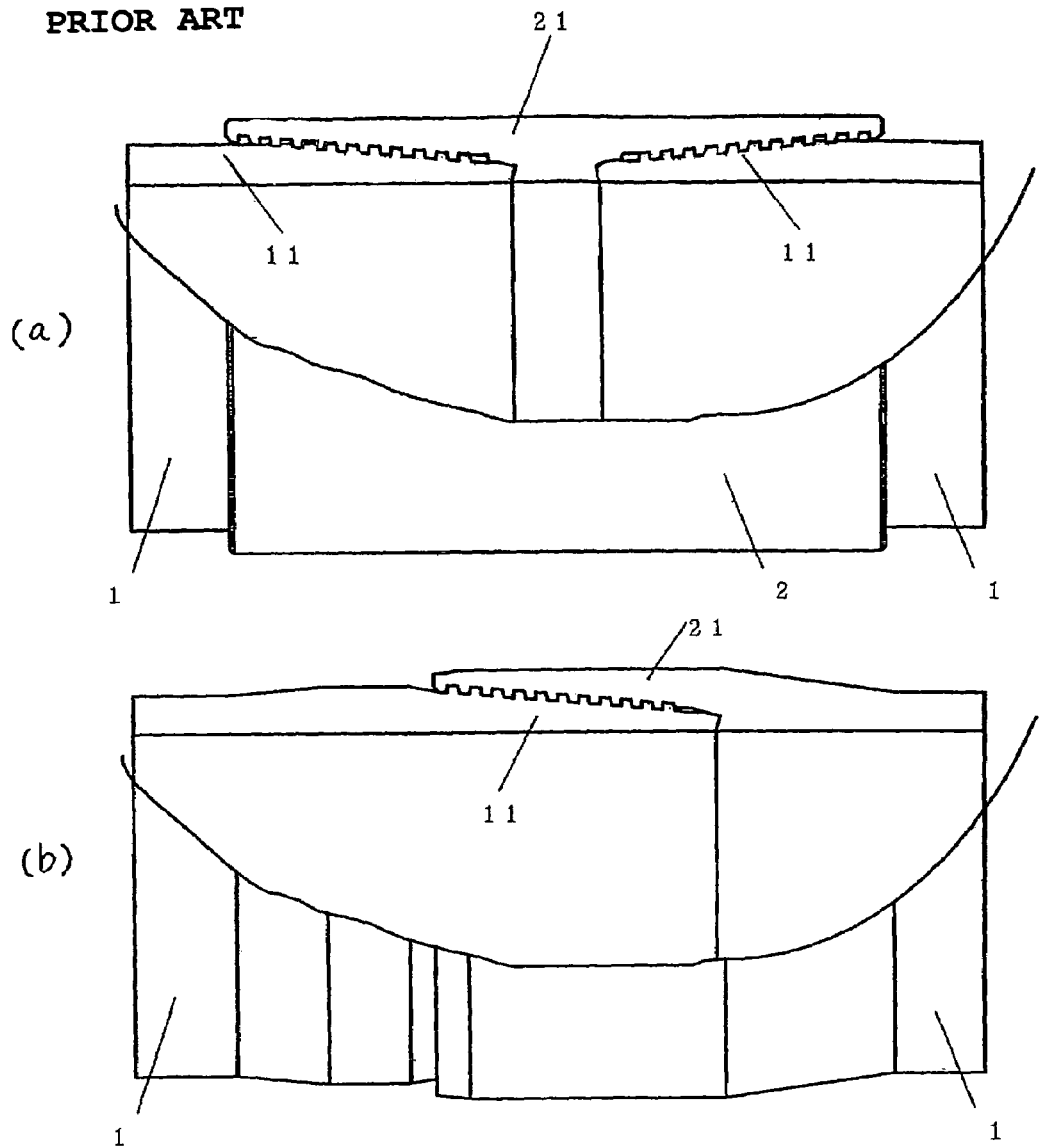
FIG. 3(a) is a schematic view for explaining a coupling-type joint and FIG. 3(b) shows an integral-type joint.
Figure 6:
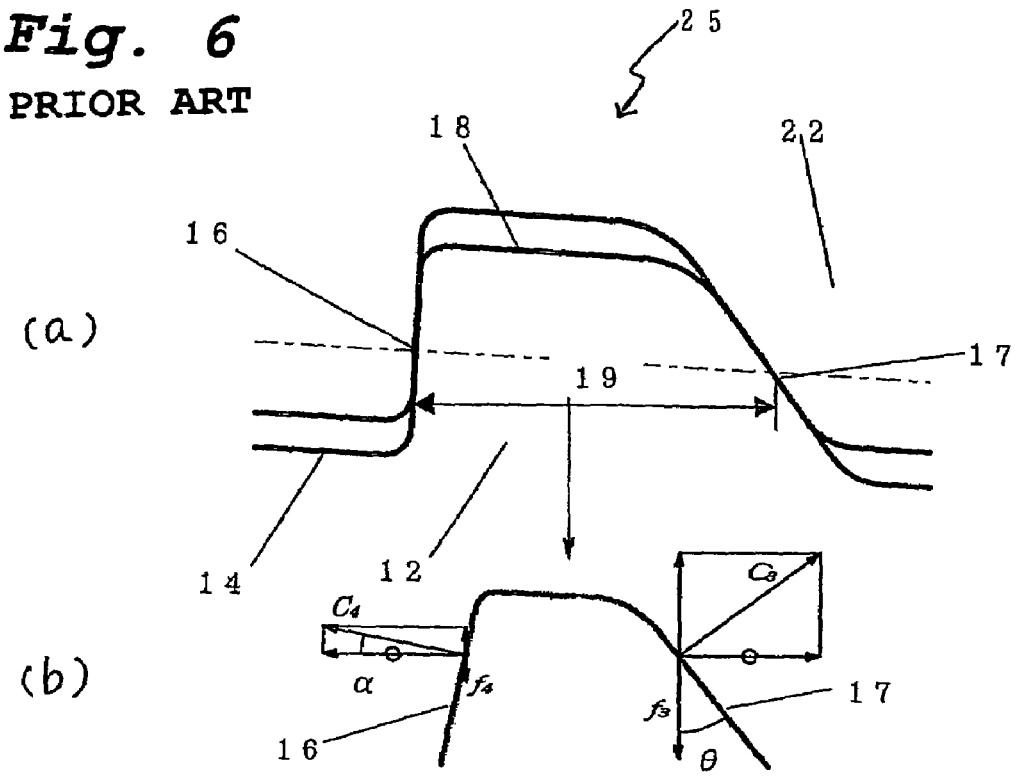
FIGS. 6(a) and 6(b) are schematic explanatory views of a rugged thread disclosed in Japanese Patent Number 2705505 or Japanese Published Unexamined Patent Application Hei 11-294650 and the balance of the mating force acting on a thread portion and the thread contact force.
Figure 7:
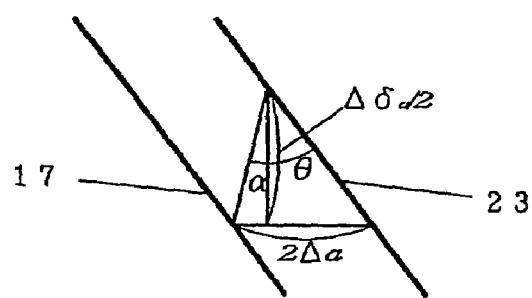
FIG. 7 is a schematic explanatory view of the gap at thread stabbing flanks for geometrically determining the change $\Delta \delta_a$ in the thread interference (over the diameter) resulting from the thread width tolerance $\Delta a$ in a rugged thread.

As for the structure of a joint which can be employed, it can be applied to all the structures shown in FIG. 2.

As for the thread dimensions, the dimensions which are provided on oil well pipes of the above-mentioned size are primarily a thread pitch of from 2.5 mm to 12.7 mm, a thread height of 0.7 mm to 4 mm, and a thread taper of 1/20 to 1/8.

If the amount c by which the thread height is reduced by cutting/grinding is made greater than necessary, the height of thread engagement decreases, and it becomes easy for jump-out (the phenomenon in which threads become disengaged when tension is applied) to occur, so it is preferably as small as possible within the range satisfying Equation 8.

As for the thread dimensions of the first mode of the present invention, a thread according to the present invention can be obtained by, for example, setting the thread pitch to 5.08 mm, the thread taper to 1/18, the height of the male threads to 1.4 mm, the height of the female threads prior to cutting/grinding to 1.6 mm, the load flank angle to 3°, the stabbing flank angle to 35°, the gap a at the thread stabbing flanks to 0.04 mm, the cutting height c to 0.2 mm, and the minimum value of the thread interference (over the diameter) to 0.2 mm.

Figure 11:
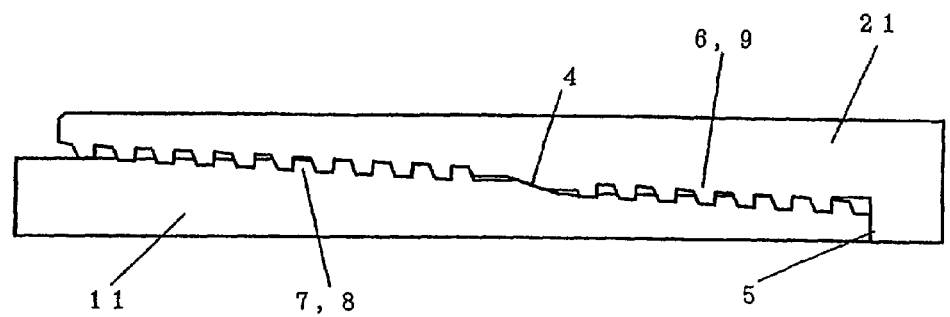
FIG. 11 is a schematic view for explaining the thread shape in another aspect of the present invention.

In yet another mode of the present invention, as shown in FIG. 11, the thread may be a two-level thread having a metal seal portion 4 disposed at its center. If a different thread shape is provided in each thread portion, such as a rugged thread for the thread at the tip of the pin (referred to below as the first thread portion) and a buttress thread as the thread on the pipe side (referred to below as the second thread portion), the above-described problems of thread cutting are solved, and a joint which is a mixture of a rugged thread and a buttress thread is easily obtained.

In addition, a metal seal portion is provided not at the tip of the pin but between the threads, so a large wall thickness can be provided in the metal seal portion of the pin, and since a tapered thread portion which meshes with the box portion is provided closer to the end of the pin than the metal seal, the bending stiffness of the metal seal portion of the pin becomes extremely large.

Therefore, even if external pressure acts and penetrates to just before the metal seal, shrink deformation and bending deformation of the pin member can be reduced to an extremely low level.

With the wall thickness (approximately 4-20 mm) of a steel pipe which is the object of the present invention, if there are three or more levels of thread portions, threaded engagement of the thread becomes poor, so there are preferably two levels.

Either a rugged thread or a buttress thread can be provided in the first thread portion or the second thread portion, but from the standpoint of manufacture, it is preferable to provide one type of thread as a continuous thread in each thread portion.

A metal seal portion is provided in at least one location between the first thread portion and the second thread portion (portion B), but in addition thereto, a second or third metal seal or a sealing ring made of a soft material such as rubber or a polymer or a composite material may be provided closer to the end than the first thread portion (portion C), and/or closer to the pipe (portion A) than the second thread portion (see FIG. 2(a)).

In particular, if a second metal seal portion is provided in portion C, good sealing properties can be exhibited not only with respect to external pressure but also with respect to internal pressure (see FIG. 2(b)).

Basically it does not matter how many torque shoulder portions are provided at any of locations A, B, and C.

If it is desired to make the resistance of the joint to tensile force as large as possible, a torque shoulder is preferably provided in portions B and C.

In addition, in order to exhibit the effect of increasing resistance to external pressure by the metal seal of the present invention as much as possible, a torque shoulder is preferably provided in portions A and C.

Accordingly, a preferred position for installation of a torque shoulder portion in the present invention is the location of portion C.

If the load flank angle of the thread is too gentle, the threads become disengaged (this is referred to as jump-out) when a tensile load acts, which is undesirable. If it is too steep a negative angle, the process of cutting the threads becomes difficult, and manufacturing costs greatly increase. Accordingly, a preferred range for the thread load flanks is in the range of −10° to +10° with respect to a plane perpendicular to the joint axis.

In the same manner, if the stabbing flank angle of the threads is too gentle, the excellent resistance to compression which is a characteristic of a rugged thread ends up decreasing, whereas if it is too steep, the allowable tolerances for thread groove cutting become too severe and manufacture ends up becoming difficult, so the thread stabbing flank angle is preferably from +15° to +50°.

As another method, the present inventors discovered the following method.

Namely, by employing two thread ridges, by using a chaser having a shape of two threads so that the two thread ridges can be simultaneously worked, and by making one of the two thread ridges a rugged thread and the other a thread which is not a rugged thread (referred to below as a "nonrugged thread"), two different threads can be simultaneously worked with a single tool.

Of course, it is necessary to ensure that the threads of the first thread ridge and the second thread ridge can each engage with a corresponding thread groove of the both of the first thread ridge and the second thread ridge. For this purpose, either the male thread or the female thread must have exactly the same thread shape and thread dimensions for the first thread ridge and the second thread ridge.

Figure 12:
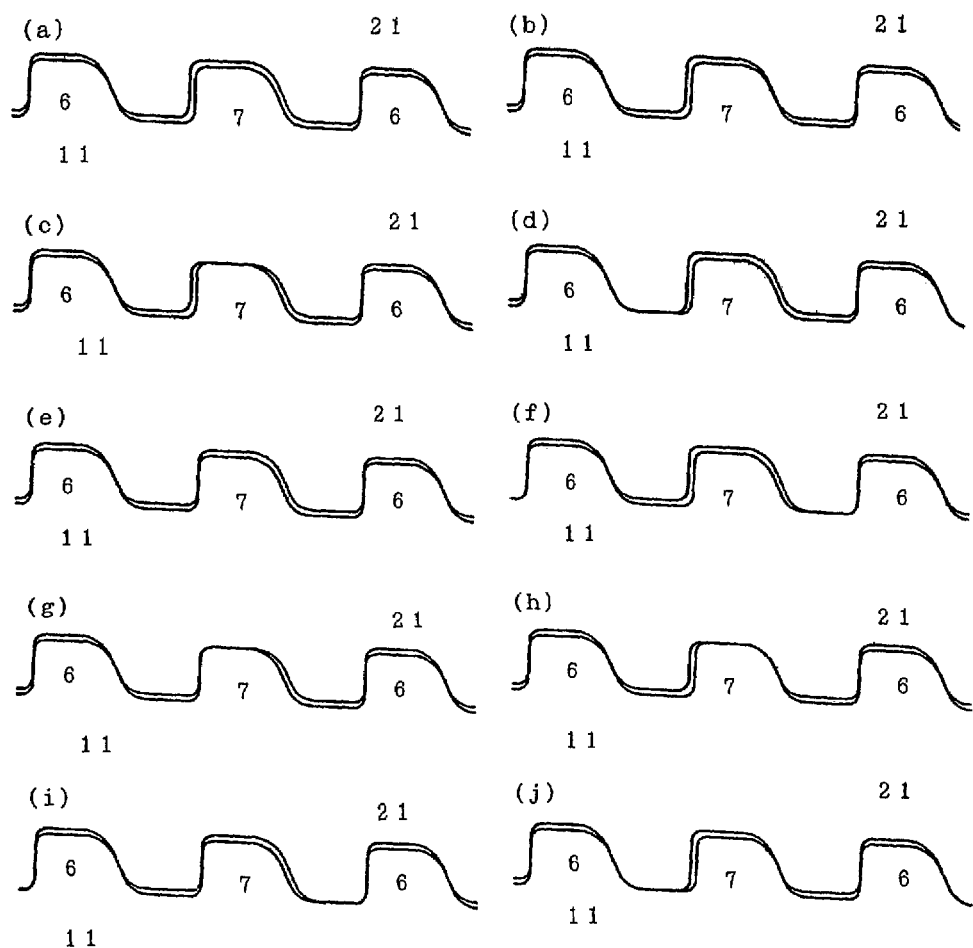
FIGS. 12(a)-12(j) are schematic views for explaining the thread shape in still other aspects of the present invention.

The ten different combinations shown in FIG. 12 for the state of contact of the sloping surfaces of the nonrugged thread are conceivable when the rugged thread has contact along both sloping surfaces of the male thread.

FIG. 12(a) shows the case in which there is not contact at any of the four surfaces of the nonrugged thread, FIG. 12(b) shows the case in which there is contact only at the stabbing flank, FIG. 12(c) shows the case in which there is contact only at the crest surface, FIG. 12(d) shows the case in which there is contact at the thread root surface forward of the load flank of the nonrugged thread, FIG. 12(e) shows the case in which there is contact only at the load flank, FIG. 12(f) shows the case in which there is contact at the thread root to the rear of the stabbing flank of the nonrugged thread, FIG. 12(g) shows the case in which there is contact at the load flank and the thread crest surface, FIG. 12(h) shows the case in which there is contact at the thread crest surface and the stabbing flank, FIG. 12(i) shows the case in which there is contact at the load flank and at the thread root surface to the rear of the stabbing flank, and FIG. 12(j) shows the case in which there is contact at the thread root surface forward of the load flank and at the stabbing flank.

Those cases in which (i) the nonrugged thread simultaneously has contact at the load flank and the stabbing flank, (ii) there is simultaneous contact at the thread crest surface and the thread root surface, and (iii) there is contact at three or more surfaces, and (iv) there is contact at three continuous thread surfaces of either a rugged thread or a nonrugged thread are outside the scope of the present invention.

This is because in case (i), if the load flanks and the stabbing flanks contact, it ends up being a rugged thread.

In addition, in case (ii) in order to have simultaneous contact at the thread crest surfaces and the thread root surface, the height of the male threads and female threads of a nonrugged thread must be exactly the same, and precision working which does not permit manufacturing tolerances is nearly impossible in actual mass production.

The same applies to (iii) and (iv). Making at least three surfaces of a trapezoidal thread exactly contact at the same time requires that the dimensions of the thread crest and the corresponding thread groove be exactly the same. However, precise working which does not allow manufacturing tolerances is nearly impossible in actual mass production.

The angles of the sloping surfaces are of course the same for the rugged thread and the nonrugged thread.

Up to now, a two-start thread was described, but another mode of the present invention may be a multiple-start thread having more than two thread ridges. In this case, the number of threads of the rugged thread is given by $1 \leq n \leq$ (number of thread ridges/2).

As for the structure of a joint to which such a thread can be applied, it can be applied to all of the structures shown in FIG. 2. However, with a joint having a seal or a shoulder at the intermediate position B, in order to provide a two-start thread or a multiple-start thread, since the lengths of the threads on the inner side and outer side are short, it is preferable to apply the thread to a joint which does not have a seal or shoulder at the intermediate position B and which has a continuous thread.

EXAMPLE

Example 1

In order to demonstrate the effects of the present invention more concretely, the following numerical simulation analysis by the elasto-plastic finite element method and thread cutting test were carried out.

Figure 1:
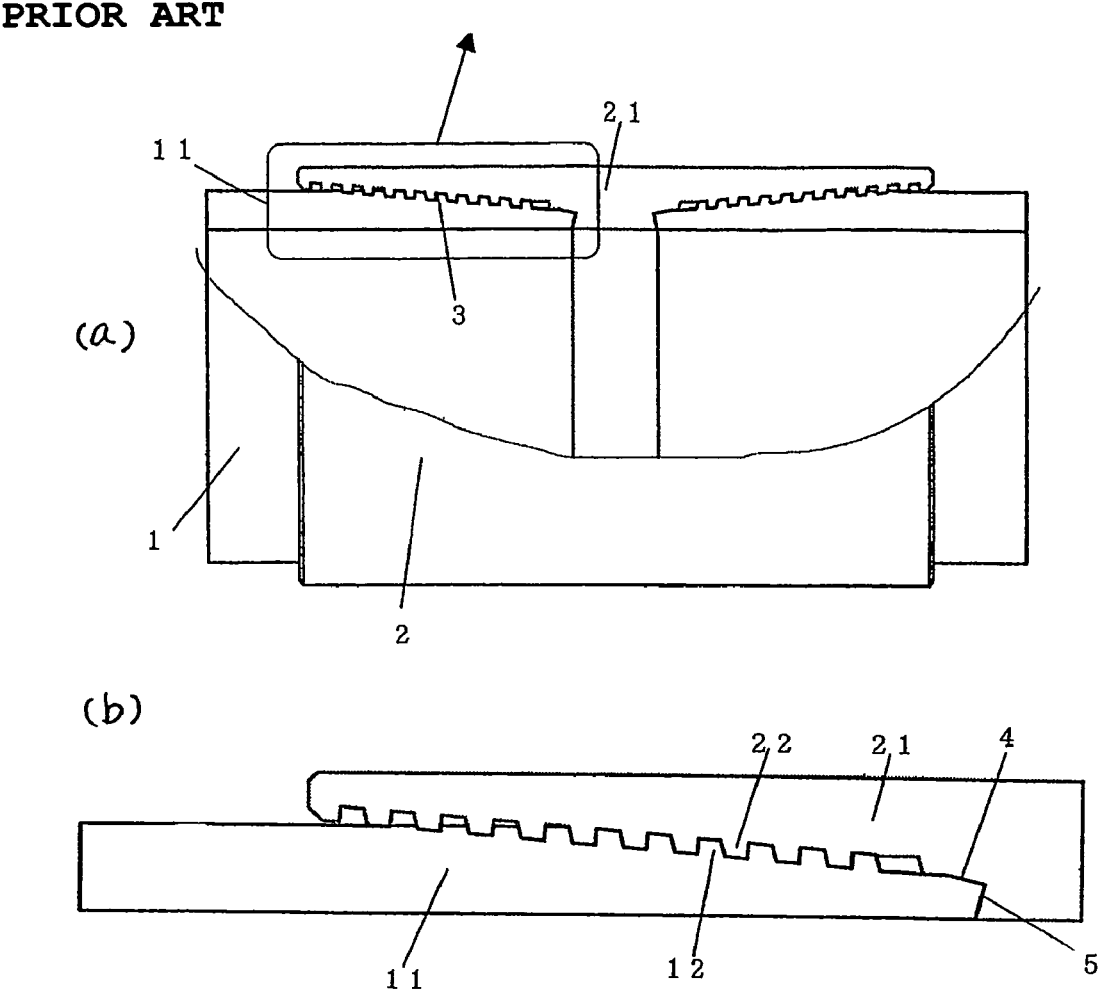
FIGS. 1(a) and 1(b) are schematic cross-sectional views of one example of a typical premium joint for an oil well pipe (coupling pipe) and an enlarged view of a portion thereof.

The subject of evaluation was the coupling-type threaded joint for oil well pipes shown in FIG. 1. It was a joint for a 5-½ inch #20 pipes (outer diameter of 139.7 mm, wall thickness of 9.17 mm) joint.

The material was that having the API specification P110. In finite element analysis, it was treated as an elasto-plastic body with an isotropic hardness, and it was numerically modeled as having a coefficient of elasticity of 210000 MPa and having a 0.2% strength equal to the nominal yield strength of 110 ksi (758 MPa).

Table 1 shows the joints on which evaluation was carried out. The shapes of the metal seal portions and the torque shoulder portions being analyzed were slightly different from each other, but the minimum values and the maximum values of the seal interference were all the same.

For the thread shapes which were evaluated, the thread pitch was 5.08 mm and the thread taper was 1/18 for each one.

TABLE 1

| Sample No. | Evaluation | Manufacturing tolerance of thread interference (over diameter) | Load flank angle | Stabbing flank gap | Stabbing flank angle | Thread height | No. of rugged threads/total number of threads | Comments |
|---|---|---|---|---|---|---|---|---|
| 1 | Analysis only | 0.2 mm | +3° | 0.04 mm | 35° | 1.6 mm | 4/15 | Threads of first mode of invention |
| 2 | Analysis and test | 0.2 mm | +3° | 0.04 mm | 35° | 1.6 mm | 7/15 | Threads of second mode of invention |
| 3 | Test only | 0.2 mm | +3° | 0.04 mm | 45° | 1.6 mm | 7/15 | Threads of third mode of invention (based on threads of second mode) |
| 4 | Analysis | 0.2 mm | +3° | 0.00 mm | 35° | 1.6 mm | 15/15 | All rugged threads |
| 5 | Analysis | 0.19 mm | −3° | 0.09 mm | 10° | 1.58 mm | 0/15 | All buttress threads |

In a first analysis, with respect to the joints in Table 1, thread make-up analysis was carried out using the combination of interference for which the generated torque was a maximum and using the combination of interference for which it was smallest, and the variation in shouldering torque was evaluated.

In a second analysis, analysis in which compression corresponding to 100% of the yield strength of the pipe body (2852 kN=291 tons) was applied and then released was carried out for each joint in Table 1, and the degree to which the joint loosened (whether it underwent damage) was evaluated by the proportion of the torque generated after removal of the load to the make-up torque this is referred to as the torque maintaining rate and the higher its value the more difficult it is for loosening to take place (the better are the properties)).

The thread cutting test was carried out only on Samples 2 and 3. Thread cutting was carried out on 10 pipes, and the number of test pipes on which burrs requiring removal were formed (having a height of approximately 0.15 mm or higher) was recorded.

The results of evaluation are shown in Table 2.

TABLE 2

| | Results of analysis | | Test results |
|---|---|---|---|
| Sample No. | Variation of shouldering torque* | Torque maintenance rate after release of compression | Number of test specimens requiring burr removal |
| 1 | 3991 ft · lb | 78.2% | — |
| 2 | 5359 ft · lb | 82.0% | 9 pipes |
| 3 | — | — | 3 pipes |
| 4 | 8849 ft · lb | 84.4% | — |
| 5 | 1915 ft · lb | 51.6% | — |

*1 ft · lb = 1.356 N · m

From these results, it can be seen that for the threads of either of Samples 1 and 2 according to the present invention, the torque variation was small compared to Sample 4, which employed entirely a rugged thread, and the extent of torque reduction after removal of a compressive load was significantly better compared to the buttress thread of Sample 5, and approximately the same result was obtained as for Sample 4.

In addition, it can be seen that the number of test pipes for which burr removal was necessary was greatly reduced for Sample 3, which had 3 pipes, compared to Sample 2, which had 9 pipes.

From the above results, it is clear with that a thread according to the present invention, torque variation is greatly improved compared to a rugged thread, excellent resistance to compression is maintained, and the formation of burrs is greatly suppressed according to the third mode of the present invention.

Example 2

In this example, Example 1 was repeated, and numerical simulation analysis by the elasto-plastic finite element method was carried out.

Table 3 shows the joints on which evaluation was carried out. Sample 6 which was a joint according to the present invention had a rugged thread as a first thread portion of a two-level thread and a buttress thread as a second thread portion. A metal seal was disposed only in portion B, and a torque shoulder was disposed only in portion C.

The joints of Samples 7-8 were one-level threads like that shown in FIG. 1. They had a structure in which a metal seal and a torque shoulder were provided at the end portion of a pin.

The seal shape and the torque shoulder shape of the joints of Samples 6-8 were each slightly different from those described above, but the minimum value and maximum value of the interference imparted to the metal seal portion were all made the same.

Of the thread shapes, Samples 6-8 each had a thread pitch of 5.08 mm and a thread taper of 1/18.

TABLE 3

| Sample No. | Manufacturing tolerance of thread interference (over diameter) | Load flank angle | Stabbing flank angle | Stabbing flank gap | No. of rugged threads/total number of threads | Comments |
|---|---|---|---|---|---|---|
| 6 | 0.2 mm | +3° | 35° | 0.09 mm for buttress thread portion, 0.00 mm for rugged thread portion | 8/17 | Threads of present invention |
| 7 | 0.2 mm | +3° | 35° | 0.00 mm | 15/15 | All rugged threads |
| 8 | 0.19 mm | −3° | 10° | 0.09 mm | 0/15 | All buttress threads |

In a first analysis, thread make-up was analyzed with respect to the joints of Samples 6 and 7 of Table 3 for the combination of interference providing the largest generated torque and the combination providing the smallest generated torque, and the variation in shouldering torque was evaluated.

In a second analysis, after the joints of Samples 6-8 of Table 3 were subjected to a compressive load corresponding to 100% of the yield strength of the pipe body (2852 kN=291 tons), analysis of the release of compression was performed. The extent to which the joint loosened (whether it underwent damage) was evaluated based on the ratio of the generated torque after release of the load to the make-up torque (this is referred to the torque maintenance rate; the higher its value the more difficult it is for loosening to take place (the better the properties)).

In a third analysis, analysis was carried out by applying a pipe crushing external pressure (76.5 MPa) prescribed by API standard 5C3 to joints of Samples 6 and 7 of Table 3, and the extent to which the contact force in the metal seal portions was maintained was compared based on the ratio of the contact force at the time of application of an external pressure to the contact force at the time of make-up (this is referred to as the contact force maintenance rate).

Table 4 shows the results of evaluation. From these results, it can be seen that the joint according to the present invention of Sample 6 had a much smaller torque variation than the joint of Sample 7 having all rugged threads, the reduction in torque after release of compression was much better compared to the buttress thread of the joint of Sample 8, and the contact force maintaining rate in the metal seal portion under an external pressure was also good.

From the above results, it is clear that a thread according to the present invention is greatly improved with respect to torque variation compared to a rugged thread, it maintains excellent resistance to compression, and it also has excellent ability to seal against external pressure.

TABLE 4

| Sample No. | Variation of shouldering torque* | Torque maintenance rate after release of compression (%) | Seal contact force maintenance rate during external pressure load (%) |
|---|---|---|---|
| 6 | 5625 ft · lb | 92.3 | 84.3 |
| 7 | 8849 ft · lb | 84.4 | 40.4 |
| 8 | — | 51.6 | — |

*1 ft · lb = 1.356 N · m

Example 3

In this example, Example 1 was repeated, and numerical simulation analysis by the elasto-plastic finite element method and estimation of the time for thread make-up were carried out.

Table 5 shows the joint on which evaluation was carried out. Ones shown in FIG. 12 were used as representative examples of the present invention. The shapes of the metal seal portion and the torque shoulder portion being analyzed had slight differences, but the minimum and the maximum values of the seal interference were the same for each.

Of the thread shapes which were analyzed, the thread pitch was 5.08 mm and the thread taper was 1/18 for each one.

TABLE 5

| Sample No. | Manufacturing tolerance of thread interference (over diameter) | Load flank angle | Stabbing flank angle | Thread height | Comments |
|---|---|---|---|---|---|
| 9 | 0.2 mm | +3° | 35° | 1.6 mm | Thread mode of FIG. 12(a) |
| 10 | 0.2 mm | +3° | 35° | 1.6 mm | Thread mode of FIG. 12(e) |
| 11 | 0.2 mm | +3° | 35° | 1.6 mm | Thread mode of FIG. 12(i) |
| 12 | 0.2 mm | +3° | 35° | 1.6 mm | All single-start rugged threads |
| 13 | 0.19 mm | −3° | 10° | 1.58 mm | All single-start buttress threads |

In a first analysis, thread make-up was analyzed with respect to the joints of Table 5 for the combination of interference providing the largest generated torque and the combination providing the smallest generated torque, and the variation in shouldering torque was evaluated.

In a second analysis, after each of the joints of Table 5 was loaded with a compressive load corresponding to 100% of the yield strength of the pipe body (2852 kN=291 tons) analysis of the release of compression was carried out. The extent to which the joint loosened (whether it underwent damage) was evaluated based on the amount of decrease of the generated torque after release of the load relative to the make-up torque (this is referred to as the torque maintenance rate; the higher its value, the more difficult it is for loosening to take place (the better are the properties)).

In addition, the operating time required for make-up of threads with respect to the joints of Samples 9 and 12 was carried out by comparison with past results.

The results of evaluation are shown in Table 6. From these results, it can be seen that for any of Samples 9-11 which had threads according to the present invention, the torque variation was small compared to Sample 12 which was entirely a rugged thread, the extent of decrease in torque after release of a compressive load was much better compared to the buttress thread of Sample 13, and it was approximately the same as for Sample 12.

TABLE 6

| | Results of analysis | | |
| --- | --- | --- | --- |
| Sample No. | Variation of shouldering torque* | Torque maintenance rate after release of compression (%) | Time required for make-up (minutes) |
| 9 | 7455 ft · lb | 85.8 | approx. 4 minutes |
| 10 | 8202 ft · lb | 81.3 | " |
| 11 | 7518 ft · lb | 81.7 | " |
| 12 | 8849 ft · lb | 84.4 | approx. 5 minutes |
| 13 | 1915 ft · lb | 51.6 | " |

*1 ft · lb = 1.356 N · m

As for the estimated time required for thread make-up, compared to the case single-start thread like Sample 12, a two-start thread according to the present invention can shorten the time by approximately 20%.

The basis for estimating the make-up time was as follows. If make-up is considered as being divided into the three stages of (i) stabbing (the process of vertically inserting a pin member into a box member) and hand tightening (the operator performs rotation by hand until a position at which rotation stops), (ii) machine tightening (the process of tightening to a prescribed torque by a machine such as power tongs) and (iii) adjustment after make-up, with the single-start thread, the time required was roughly (i) two minutes, (ii) two minutes, and (iii) one minute, but by employing a two-start thread according to the present invention, the time required for (ii) can be reduced by half.

From the above results, it is clear that a thread according to the present invention is improved with respect to torque variation compared to a rugged thread, it maintains excellent resistance to compression, and the time required for thread make-up is greatly reduced.

The invention claimed is:

1. A threaded joint for a steel pipe having
a pin member having a tapered male thread, a metal seal-forming portion, and a torque shoulder-forming portion, and
a box member having a tapered female thread, a metal seal-forming portion, and a torque shoulder-forming portion corresponding to those of the pin portion,
characterized in that the threads which constitute the tapered male thread and the tapered female thread have a first trapezoidal thread portion which does not have simultaneous contact at the load flanks and the stabbing flanks, and a second trapezoidal thread portion which has contact at the load flanks and stabbing flanks and which has gaps at the thread root surfaces and the thread crest surfaces,
wherein the first trapezoidal thread portion has contact at the load flanks and the thread root surface, and gaps at the thread crest surface and the stabbing flanks.

2. A threaded joint for a steel pipe as set forth in claim 1 characterized in that the load flank angle with respect to a surface perpendicular to the pipe axis is at least −10° and at most +10°, and the stabbing flank angle is at least +15° and at most +50°.

3. The thread joint for a steel pipe as set forth in claim 2, characterized in that the second trapezoidal thread portion is formed by decreasing the height of the female thread portion or the male thread portion and the amount of decrease "c" (over the radius) of the female thread height or the male thread height satisfies the following equation: $c > a/(\tan\alpha + \tan\beta)$.

4. A threaded joint for a steel pipe as set forth in claim 1 characterized in that the gap "a" in the axial direction at the stabbing flanks of the first trapezoidal thread portion satisfies the following equation: $0 < a < [(\tan\alpha + \tan\theta)/2] \times \delta$ wherein $\alpha$ is the load flank angle, $\theta$ is the stabbing flank angle, and $\delta$ is the thread interference (over the diameter).

5. A threaded joint for a steel pipe as set forth in claim 4 characterized in that the second trapezoidal thread portion has an incomplete thread portion on the tapered male thread, and the amount of decrease "c" (over the radius) of the male thread height in the incomplete thread portion of the tapered male thread satisfies the following equation: $c > a/(\tan\alpha + \tan\theta)$.

6. A threaded joint for a steel pipe as set forth in claim 1 characterized, in that the load flank angle on ⅛ to ½ of the inner diameter side of the load flanks of the female thread is at least 25° and at most 60° with respect to a surface perpendicular to the pipe axis.

7. A threaded joint for a steel pipe as set forth in claim 1 characterized in that the stabbing flank angle on ⅛ to ½ of the inner diameter side of the stabbing flanks of the female thread is at least 25° and at most 60° with respect to a surface perpendicular to the pipe axis.

8. A threaded joint for a steel pipe as set forth in claim 1 characterized in that the load flank angle on ⅛ to ½ of the outer diameter side of the load flanks of the male thread is at least 25° and at most 60° with respect to a surface perpendicular to the pipe axis.

9. A threaded joint for a steel pipe as set forth in claim 1 characterized in that the stabbing flank angle on ⅛ to ½ of the outer diameter side of the stabbing flanks of the male thread is at least 25° and at most 60° with respect to a surface perpendicular to the pipe axis.

10. A threaded joint for a steel pipe as set forth in claim 1 characterized in that the second trapezoidal thread portion has an incomplete thread portion on the tapered male thread.

11. A threaded joint for a steel pipe as set forth in claim 1 having a metal seal-forming portion between the first trapezoidal thread portion and the second trapezoidal thread portion.

12. A threaded joint for a steel pipe as set forth in claim 11 characterized in that another metal seal-forming portion is provided in addition to the above-described metal seal-forming portion.

13. A threaded joint for a steel pipe as set forth in claim 1 wherein the thread is a multiple-start thread.

14. A threaded joint for a steel pipe as set forth in claim 13 characterized in that either one of the male thread and the female thread has the same thread dimensions and shape for each ridge of the thread.

* * * * *

UNITED STATES PATENT AND TRADEMARK OFFICE
CERTIFICATE OF CORRECTION

PATENT NO.         : 7,494,159 B2
APPLICATION NO.    : 11/710060
DATED              : February 24, 2009
INVENTOR(S)        : Sugino et al.

It is certified that error appears in the above-identified patent and that said Letters Patent is hereby corrected as shown below:

Column 10 Line 60:
"$c>b=a/(\tan á+\tan è)$"
Should read:
"$c>b= a/(\tan α+\tan θ)$ Column 20 Line 11:
"height satisfies the following equation: $c>a/(\tan α+\tan β)$."
Should read:
"height satisfies the following equation: $c>a/(\tan α+\tan θ)$."

Signed and Sealed this

Twenty-sixth Day of January, 2010

David J. Kappos
*Director of the United States Patent and Trademark Office*